United States Patent [19]

Lee

[11] Patent Number: 5,049,998
[45] Date of Patent: Sep. 17, 1991

[54] CIRCUIT FOR IMPROVING PICTURE QUALITY BY INTERPOLATION IN A VIDEO CAMERA

[75] Inventor: Hyo-sam Lee, Suwon, Rep. of Korea

[73] Assignee: SamSung Electronics Co., Ltd., Suwon, Rep. of Korea

[21] Appl. No.: 503,943

[22] Filed: Apr. 4, 1990

[30] Foreign Application Priority Data

Sep. 7, 1989 [KR] Rep. of Korea ............... 89-12947

[51] Int. Cl.$^5$ .......................................... H04N 3/15
[52] U.S. Cl. .................... 358/213.17; 358/166
[58] Field of Search ..................... 358/166, 213.17

[56] References Cited

U.S. PATENT DOCUMENTS

| 4,789,893 | 12/1988 | Weston | 358/166 X |
| 4,862,271 | 8/1989 | Smith et al. | 358/166 |
| 4,933,766 | 6/1990 | de Haan et al. | 358/166 |
| 4,941,186 | 7/1990 | Massmann et al. | 382/54 |
| 4,962,542 | 10/1990 | Klees | 382/54 |

Primary Examiner—James J. Groody
Assistant Examiner—Mark R. Powell
Attorney, Agent, or Firm—Robert E. Bushnell

[57] ABSTRACT

A circuit and method for improving picture quality by interpolation in a digital video camera or in an image processing system. A preferred embodiment performs interpolation of a video signal from a CCD image pickup device. The circuit includes a first pitch (pixel) delay circuit 20, a 2-decimation circuit, a second pitch delay circuit 30 and a third pitch delay circuit 40. The circuit further includes a first adder and multiplier 50 connected to the outputs of the second pitch delay circuit and the 2-decimation circuit, a second adder and multiplier 60 connected to an output of the third pitch delay circuit and an output of the 2-decimation circuit and an adder 70 for combining the output of circuits 10, 50 and 60 to a clock signal. The adder 70 also samples the combined signal in response to the clock signal and holds the sampled signal for output of a picture signal of improve quality.

9 Claims, 11 Drawing Sheets

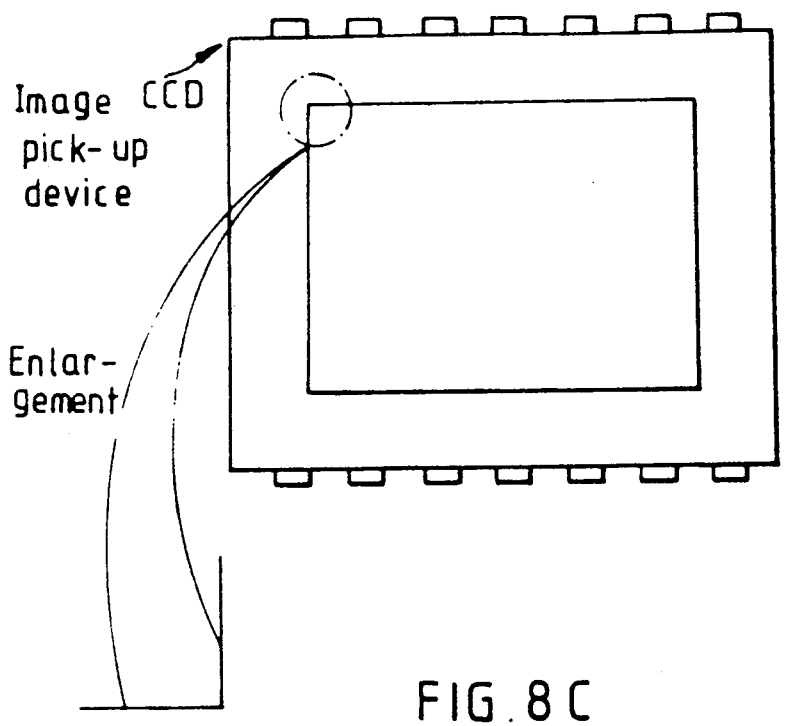
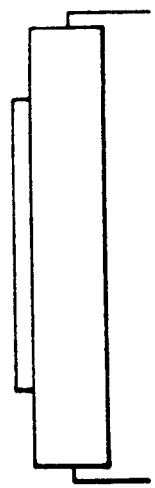
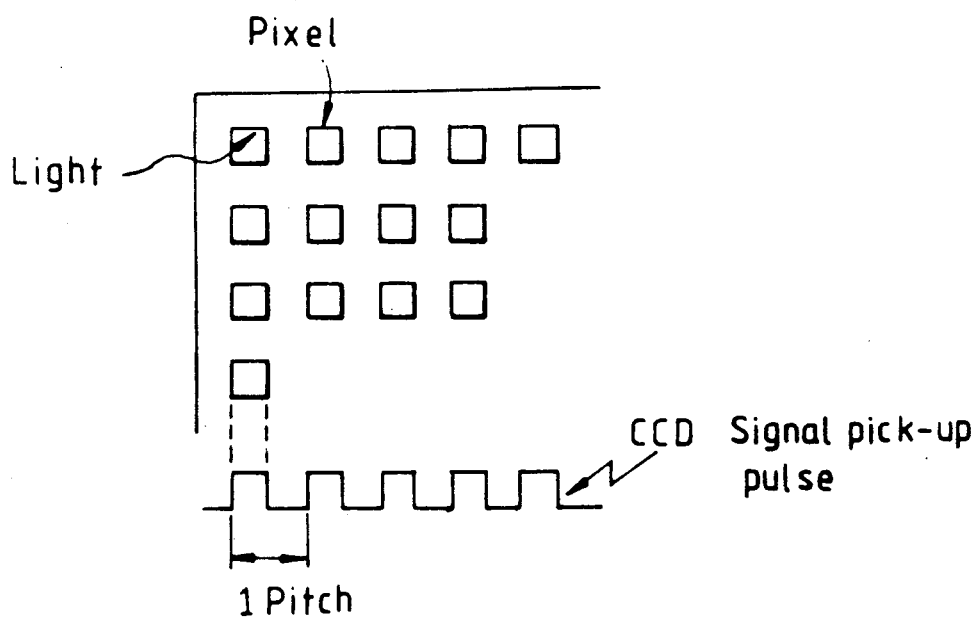

CIRCUIT FOR IMPROVING PICTURE QUALITY BY INTERPOLATION IN A VIDEO CAMERA

BACKGROUND OF THE INVENTION

1. Field of the Invention

The present invention relates to a circuit for improving picture quality which is used in a digital-to-analog converting part of a digital signal processing circuit in a video camera, a digital video camera, an image processing system, or the field of communication, and more particularly, to a circuit for improving picture quality by interpolating the sampling video signal of CCD image pickup device in the video camera.

2. Description of the Prior Art

Conventionally, the sampling signal from a output circuit of CCD image pickup device, which is photoelectric conversion device in the video camera, has been filtered through a low-pass filter. However, there have been problems in which the complete low-pass filtering is not performed because its frequency bandwidth is wide, and in which the signal-to-noise ratio of analog signal is improved but the signal-to-noise ratio of sampling analog signal is not improved.

SUMMARY OF THE INVENTION

Accordingly, the present invention has been devised to solve the foregoing problems and its object is to provide a picture quality improving circuit which is capable of improving picture quality by interpolating the sampling video signal outputted from the video camera.

BRIEF DESCRIPTION OF THE DRAWINGS

The foregoing and other objects as well as advantages of the present invention will become clear by the following description of the present invention with reference to the accompanying drawings, wherein:

FIGS. 8A–8C show constructions of CCD and one pitch therein according to the present invention.

DESCRIPTION OF THE PREFERRED EMBODIMENT

Figure 1:
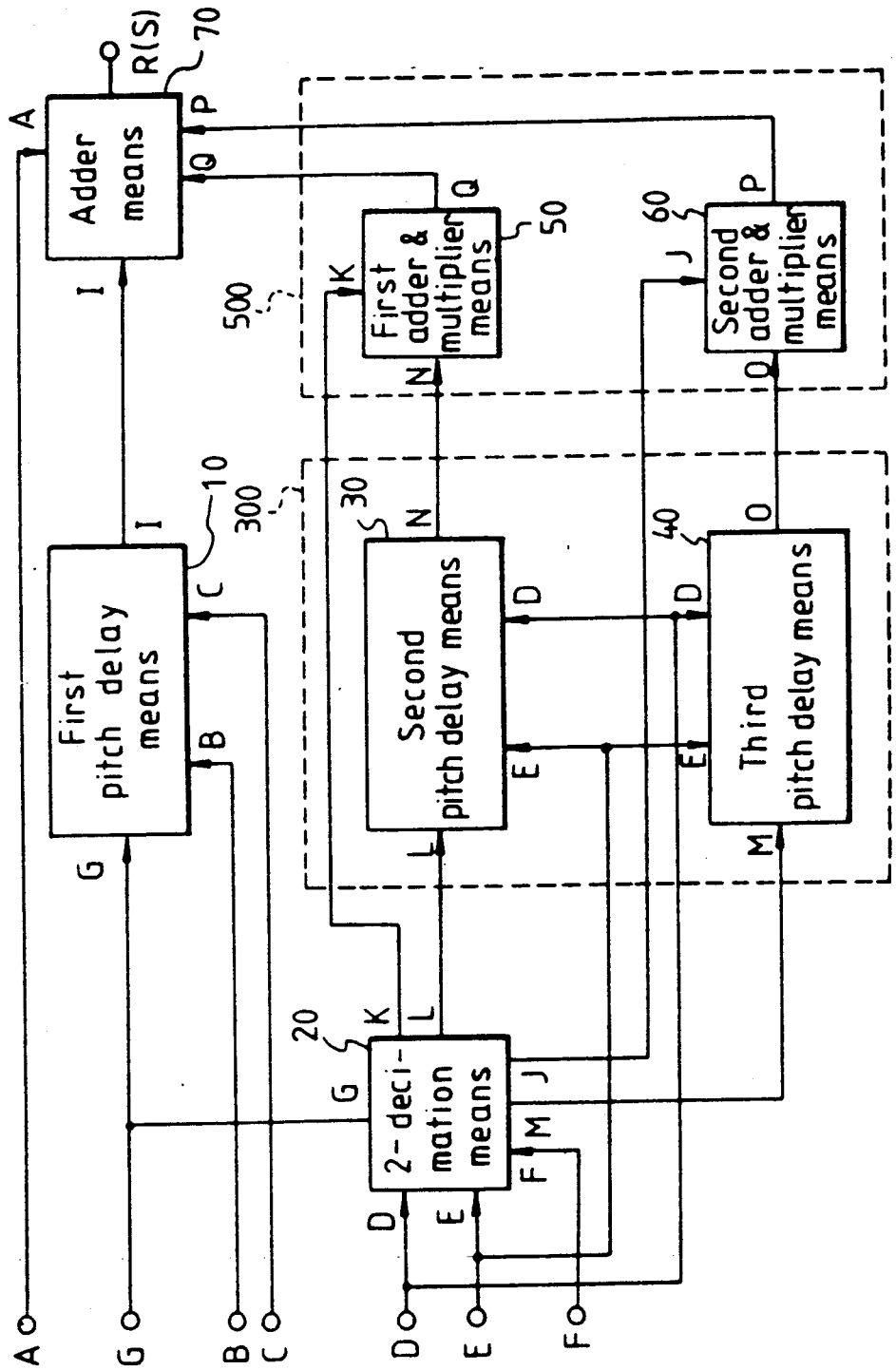
FIG. 1 is a block diagram illustrating schematically a picture quality improving circuit according to the present invention.

FIG. 1 is a block diagram illustrating, schematically, a picture quality improving circuit of the present invention. As shown in FIG. 1, the circuit of the present invention includes.

a first pitch delay circuit 10 for switching a video input signal G according to a second clock signal B to sample and hold it, and thereafter sampling it according to a third clock signal C thereby to produce a 0.5 pitch delayed signal I (that is, a signal of which the rising time is delayed by 0.5 pitch than that of the video input signal G).

A 2-decimation circuit 20 receives the video input signal G and divides or separates these signals according to whether they are odd or even values by sixth clock signal F. These odd and even signals are sampled by a 4th clock signal D and a 5th clock signal E, respectively.

An, one-pitch delay circuit 300 being constituted by a second pitch delay circuit 30 and a third pitch delay circuit 40 which switch the signals L and M, prior to sampling the odd and even values in the 2-decimation circuit 20, by the fourth and fifth clock signals D and E to hold the signal L and M, thereby producing signals N and O of which the rising times are delayed by one pitch than those of sampled signals K and J of the odd and even values from the 2-decimation circuit 20 according to said fourth and fifth clock signals D and E.

An adder and multiplier circuit 500 being constituted by a first adder and multiplier circuit 50 and a second adder and multiplier circuit 60 which add each of the output signals N and O from the second pitch delay circuit 30 and the third pitch delay circuit 40 to each of the sampled signals K and J outputted from the 2-decimation circuit 20, and multiply the added values by ½ to output the multiplied values Q and P.

An adder circuit 70 adds the output signal Q and P from the first and second adder and multiplier circuit 50 and 60 and the output signal I from the first pitch delay circuit 10 to the basic clock signal A, samples the added signal by the basic clock signal A, and holds the sampled signal thereby to output it.

Figure 5:
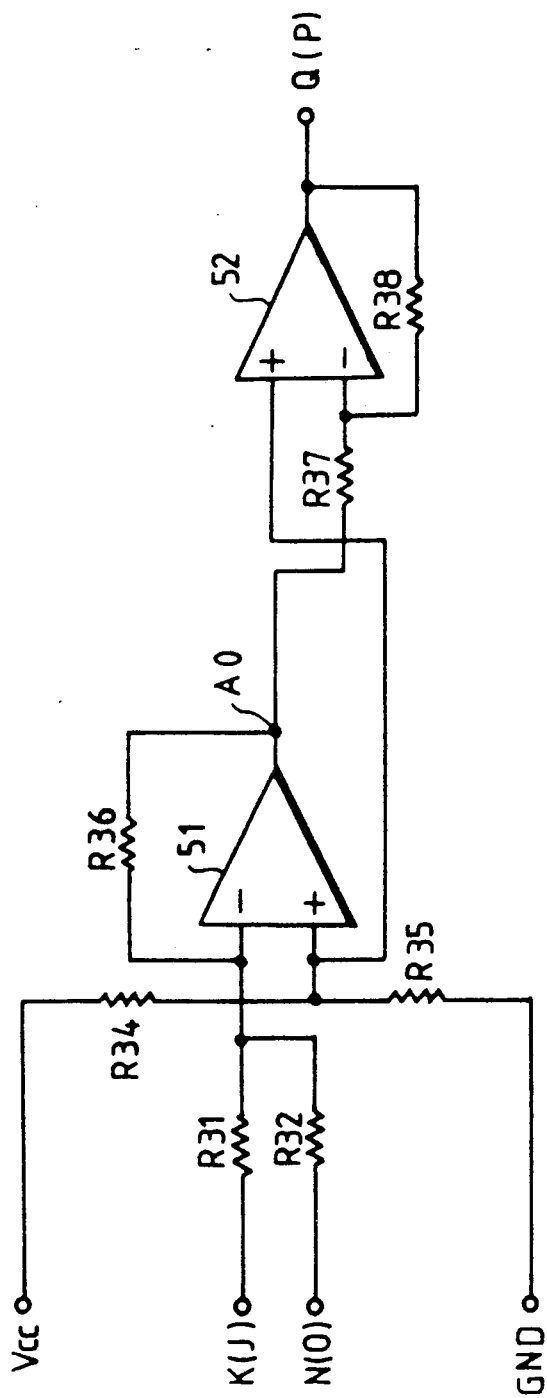
FIG. 5 is a detailed circuit diagram of first and second adder and multiplier circuits 50 and 60 in FIG. 1.
Figure 6:
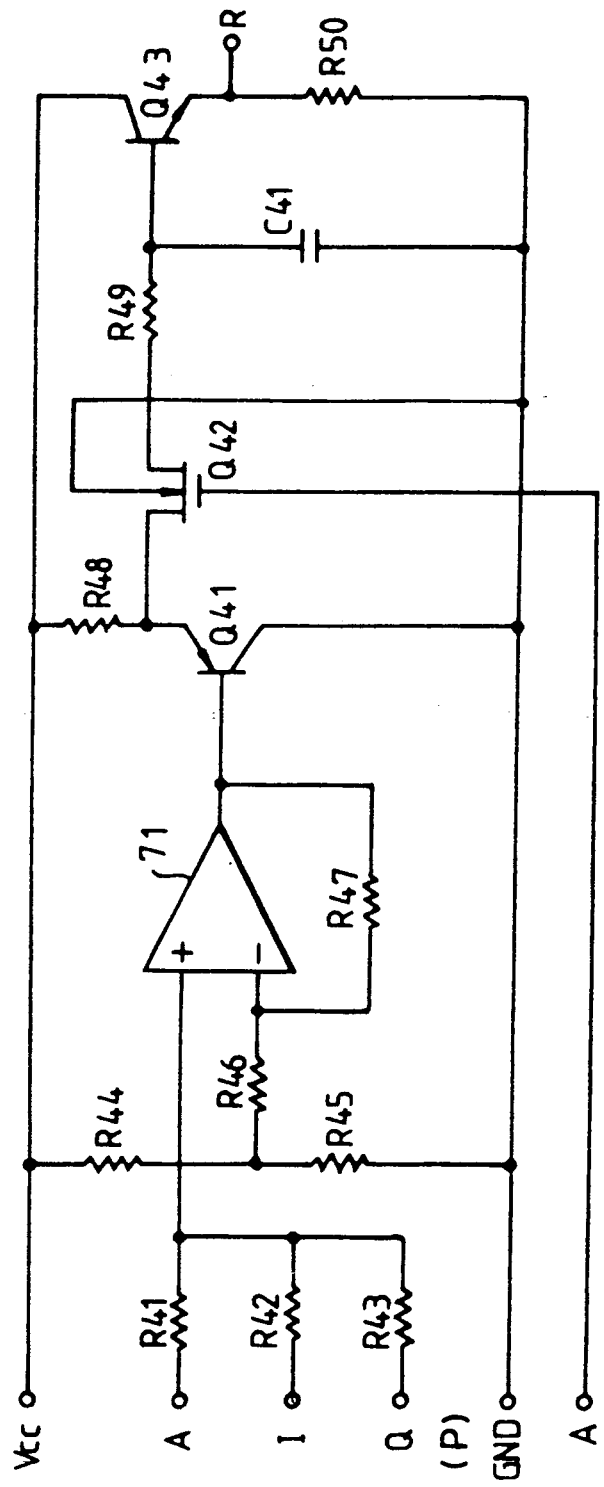
FIG. 6 is a detailed circuit diagram of an adder 70 in FIG. 1.
Figure 7A:
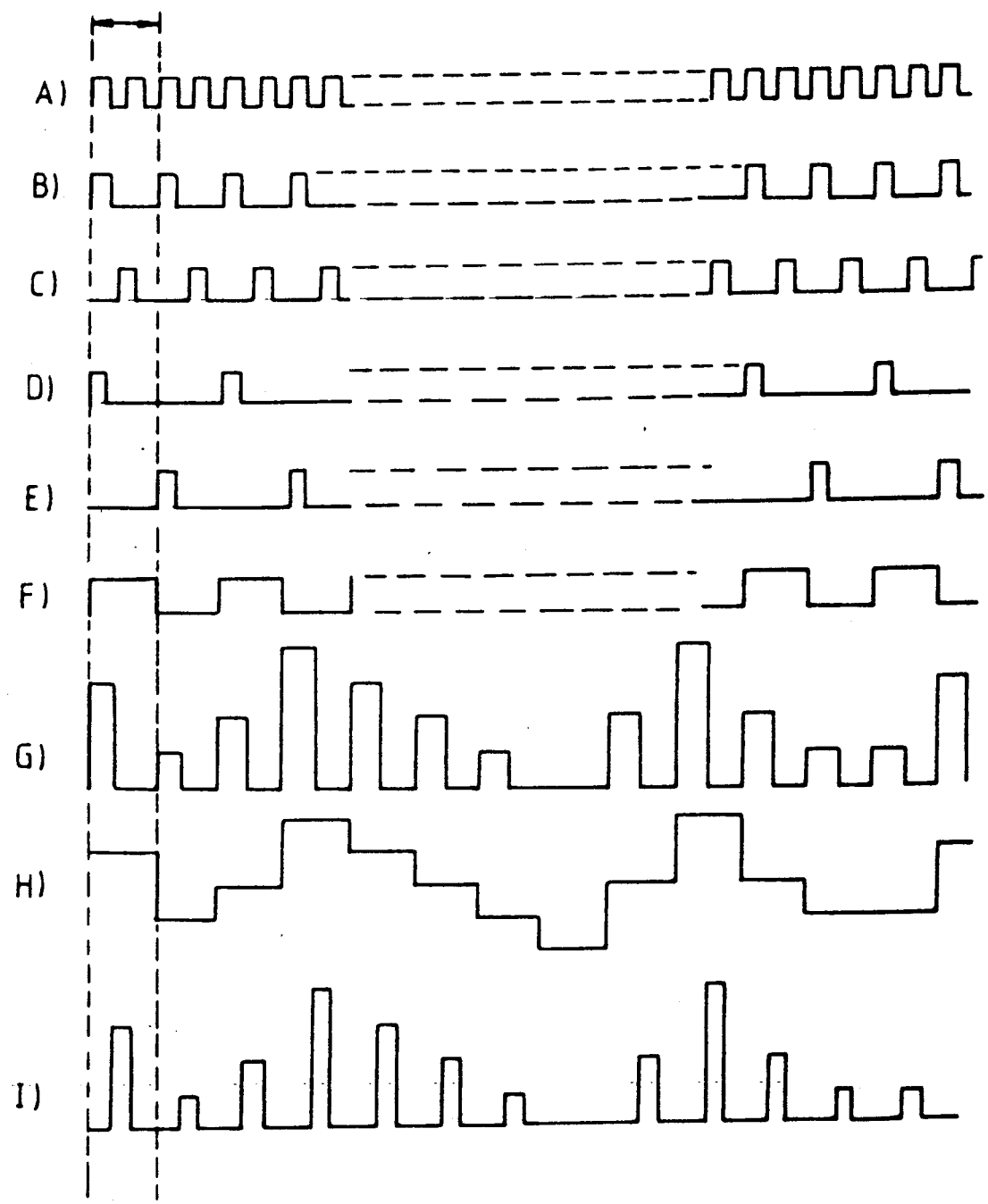
FIGS. 7A to 7S represents waveforms of signals in terminals or signal lines of each means shown in FIG. 1.
Figure 7B:
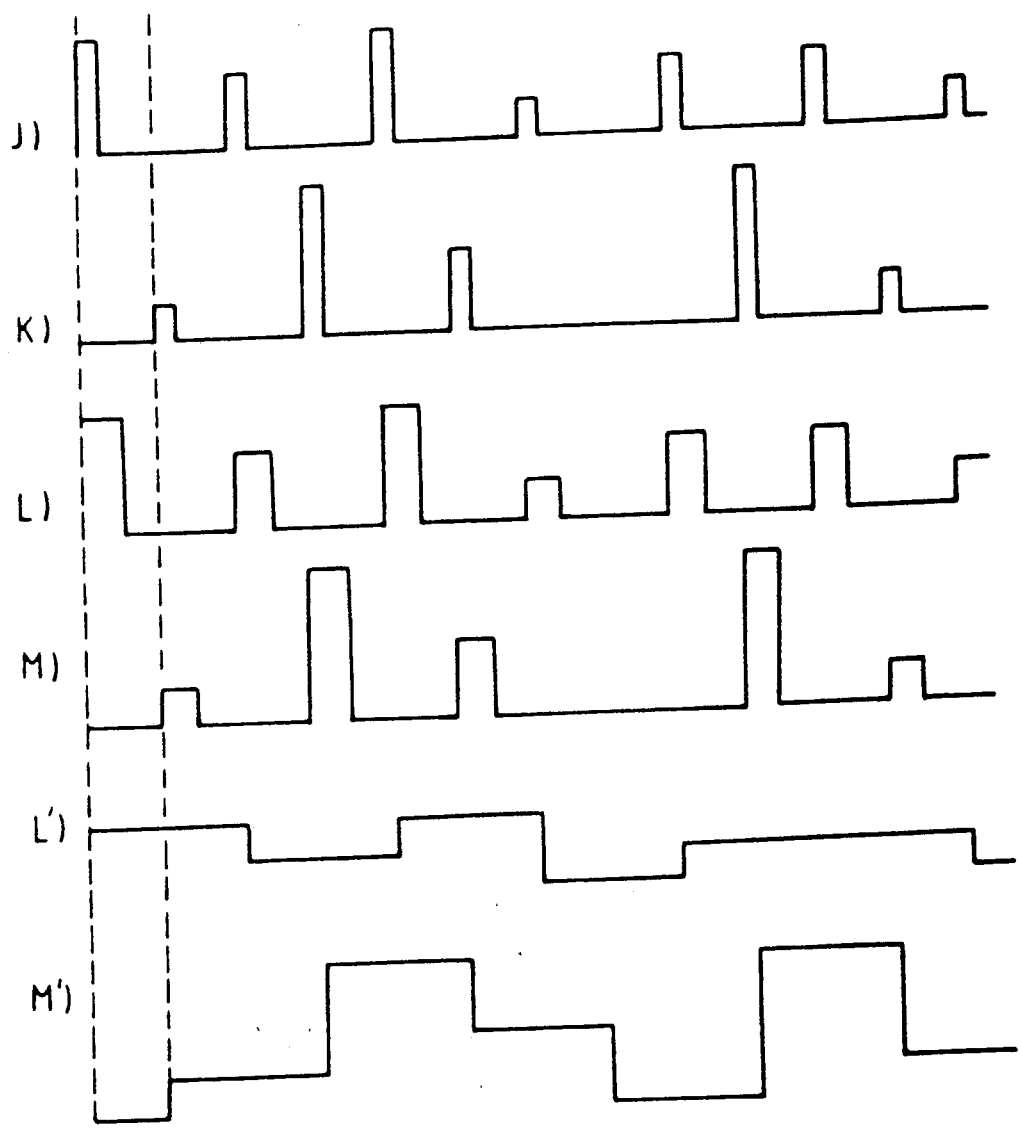
Figure 7C:
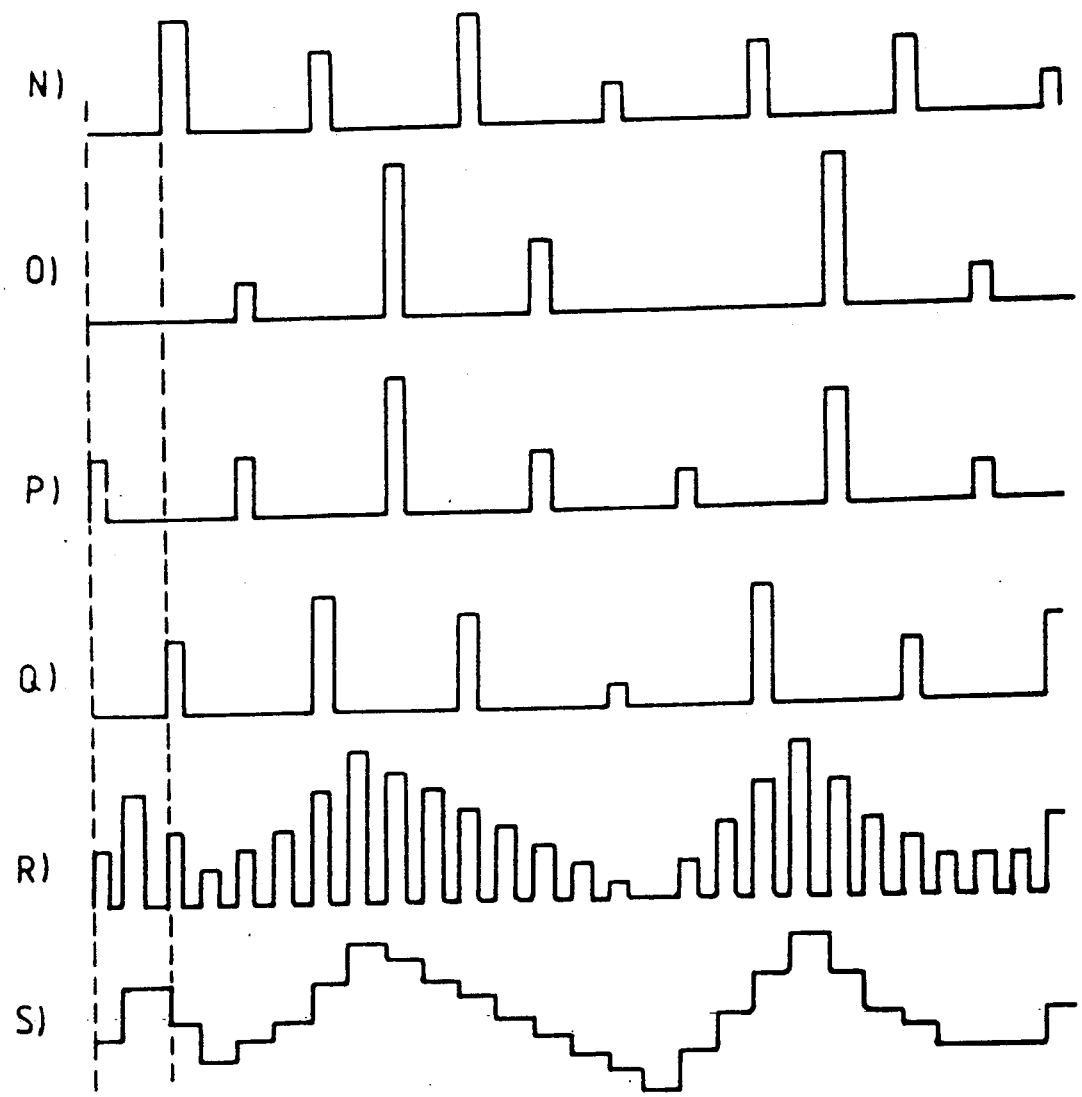

FIGS. 2 to 6 are detailed circuit diagrams of each circuits in FIG. 1, and FIG. 7 represents waveforms of signals in terminals or signal lines of each circuit shown in FIG. 1.

In FIG. 7, A represents a basic clock signal, B a second clock signal, C a third clock signal, D a fourth clock signal, E a fifth clock signal, F a sixth clock signal, G a video input signal, H a current-amplified signal, and I a 0.5 pitch delayed signal. Also, J and K represent signals prior to sampling the odd and even values of the video input signals G, L and M represent signals which sample the odd and even values of the video input signals G, L' and M' represent sample & hold signals of said signals L and M, N and O represent output signals from the second and third pitch delay means 30 and 40, Q and P represent output signals from the first and second adder & multiplier means 50 and 60, and R and S represent signals which sample G signal and H signal.

FIG. 8 is a view for explaining the constructions of CCD and one pitch therein according to the present invention, wherein A is a plan view of the CCD image pickup device, B is a side elevational view and C is a view for explaining the one-pitch construction in the CCD.

FIG. 9 represents the frequency characteristic according to the present invention wherein A represents the frequency characteristic of H signal and B represents the frequency characteristic of S signal.

The present invention will be explained in detail according to the above-mentioned construction with reference to the accompanying drawings of FIG. 1 to 9.

First of all, prior to explaining the operation of the present invention with reference to FIG. 1, the relationship among 6 clock signals A to F will be explained. As shown in FIG. 7, A is a basic clock signal, the second clock signal B is a signal in which the basic clock signal A is frequency-divided by 2, the third clock signal C is a signal of which a rising time is delayed by 0.5 pitch than that of the second clock signal B, the fourth clock signal D is a signal in which said basic clock signal A is frequency-divided once again by 2 (i.e. B/2) and the duty cycle is added optionally thereto, the fifth clock signal E is a signal of which the rising time is delayed by 1 pitch than that of the fourth clock signal D, and the sixth clock signal F is a signal in which the basic clock signal is frequency-divided by 4.

Figure 2:
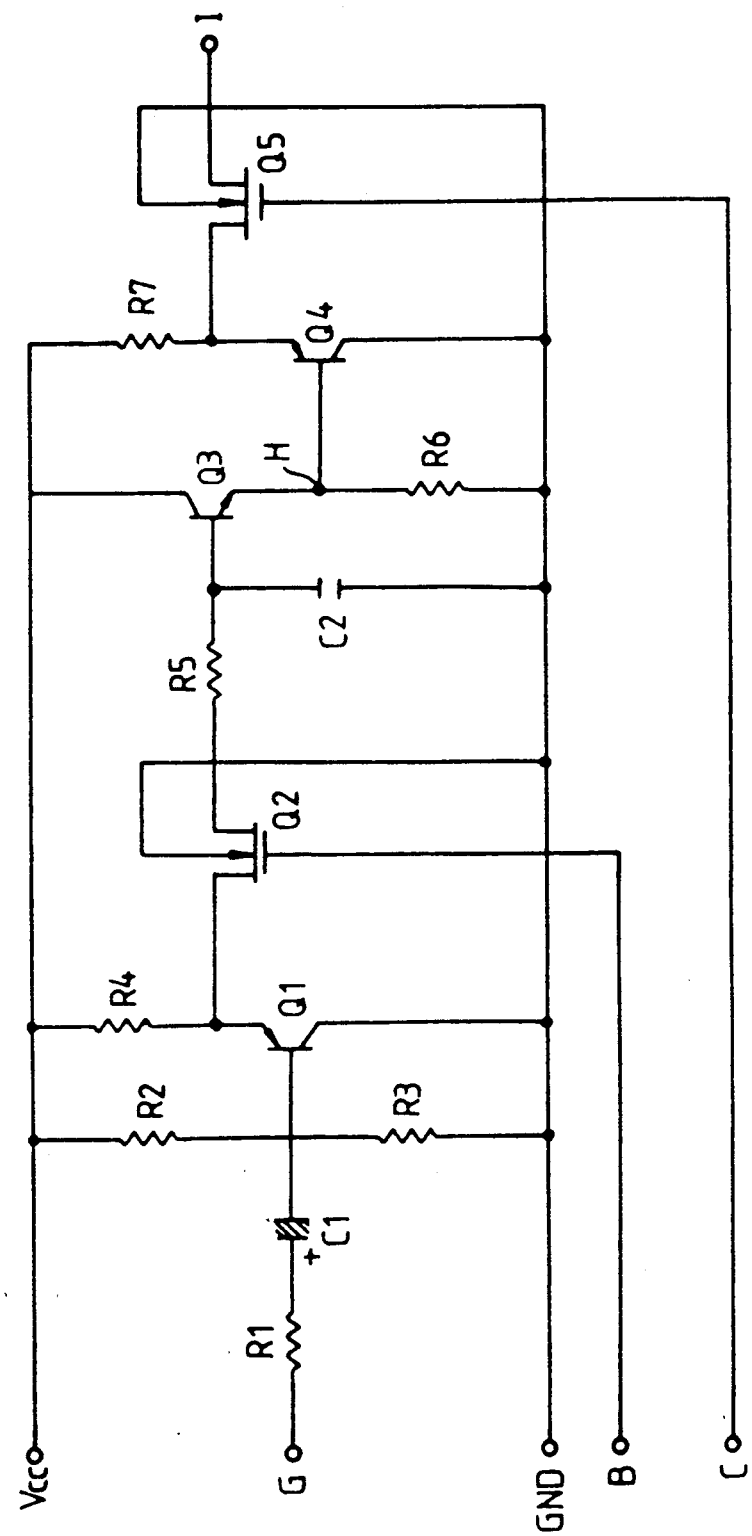
FIG. 2 is a detailed circuit diagram of a first pitch delay circuit 10 in FIG. 1.

Next, as shown in FIG. 1, the video input signal G to be processed is supplied in the waveform G shown in FIG. 7 to the first pitch delay circuit 10 and the 2-decimation circuit 20. In FIG. 2, the first pitch delay circuit 10 is shown in detail.

In FIG. 2, the first delay circuit 10 receives the video input signals G so that the current is limited at a resistor R1 and thereafter the D.C. components thereof are eliminated through a capacitor C1. These signals, of which the D.C. components are eliminated, are biased at resistors R2 and R3 connected in series with a power supply terminal Vcc and a ground terminal GND respectively. The biased signals are inputted to a first current amplifying transistor Q1 which is an emitter follower transistor so that the current thereof is amplified.

The current-amplified signals are switched at an analog switching transistor Q2 by the second clock signal B as the B waveform shown in FIG. 7 so that they are sampled and held by a resistor R5 and a capacitor C2 constituting a sample & hold circuit thereby to be current-amplified as the H waveform of FIG. 7 at a transistor Q3 being a second current amplifying transistor. The current-amplified signals are supplied through a resistor R7 to a transistor Q4 being a third current amplifying transistor so that they are again current-amplified at the transistor Q4. Thereafter the amplified signals are sampled at a transistor Q5 being a sampling circuits, according to the third clock signal as the C waveform shown in FIG. 7 so that the signals I, of which the rising times are delayed by 0.5 pitch than those of the original video input signals G, are produced thereat. And 0.5 pitch delayed signals I are applied to the adder circuit 70.

Figure 3:
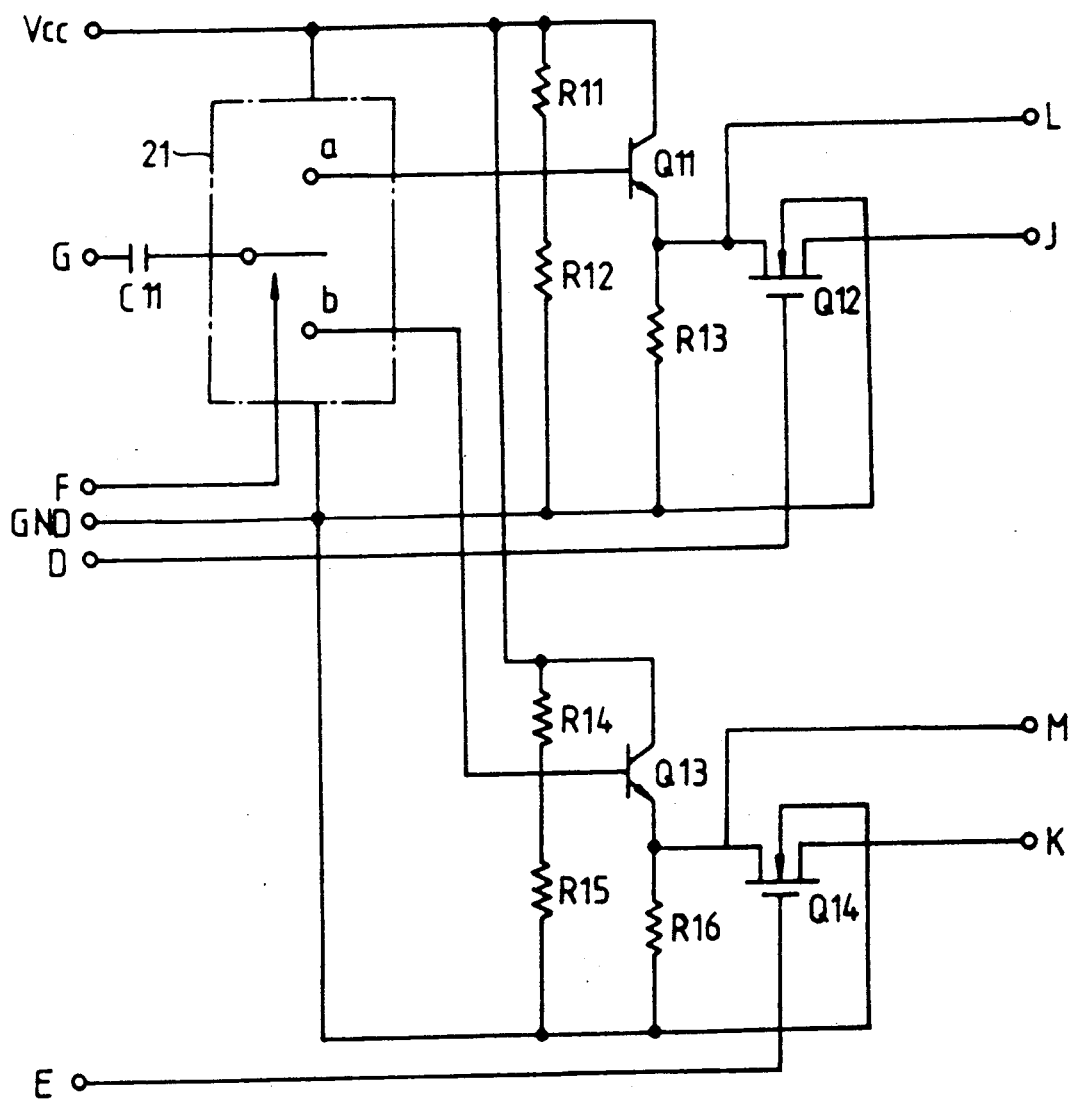
FIG. 3 is a detailed circuit diagram of a 2-decimation circuit 20 in FIG. 2.

On the other hand, the other video input signals G are applied to the 2-decimation circuit 20 shown in FIG. 3 so that the D.C. components thereof are eliminated through a capacitor C11 and thereafter are applied to an analog switch 21. And, if the sixth clock signal F as the F waveform of FIG. 7 is high, then the analog switch 21 is switched to "a" terminal by this signal F so that the applied signals are outputted to the "a" terminal. The output signals to the "a" terminal are biased at resistors R11 and R12 connected in series between the power supply terminal Vcc and the ground terminal GND and thereafter the biased signals are amplified at a transistor Q11. The current-amplified signals are supplied through a resistor R13 to a transistor Q12 so that they are switched by the fourth clock signal as the D waveform of FIG. 7 to be sampled at the sampling transistor Q12. At this time, the sampled signals, i.e. the J waveform of FIG. 7, are produced. The current-amplified signals prior to being sampled are produced as the L waveform of FIG. 7.

Also, if the sixth clock signal F is low, the analog switched 21 is switch to "b" terminal by this signal F so that the signals applied to analog switch 21 are outputted to the "b" terminal. These output signals are biased at resistors R14 and R15 and thereafter the biased signals are current-amplified at a transistor Q13 so that signals as the M waveform of FIG. 7 are produced. At a transistor Q14, the M signals are sampled by the fifth clock signal E of the E waveform of FIG. 7 of which the rising time is delayed by one pitch than that of the fourth clock signal of the D waveform of FIG. 7 so that the sampled signals of the K waveform of FIG. 7 are outputted. That is, the odd value of the video input signal G is applied to the "a" terminal of the analog switch 21 to be sampled and the even value thereof is applied to the "b" terminal of said switch 21 to be sampled. This is called "decimation".

Figure 4:
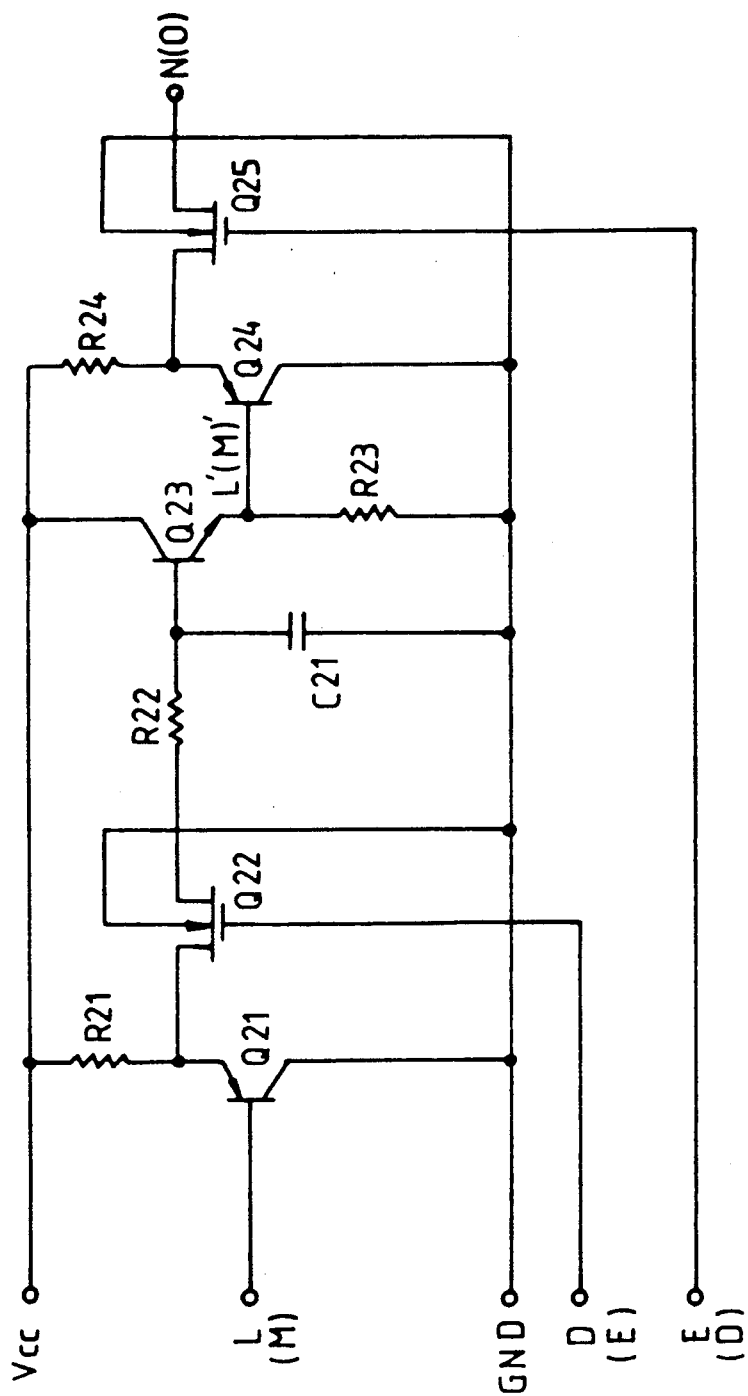
FIG. 4 is a detailed circuit diagram of a second pitch delay 30 or a third pitch delay circuit 40 in FIG. 1.

The L signal outputted from the 2-decimation circuit 20 is applied to the second pitch delay circuit 30 shown in FIG. 4. The second pitch delay circuit 30 and third pitch delay circuit 40 have the input and output signals different from each other but the constructions circuits thereof are equal to each other, and the first adder and multiplier circuit 50 and the second adder and multiplier circuit 60 are similar to the preceding case. Therefore, here, the operations will be explained with respect to only the second pitch delay circuit 30 and the first adder and multiplier circuit 50.

In FIG. 4, said L signal is applied to a transistor Q21 to be current-amplified. This current-amplified signal is switched at a transistor Q22 by the fourth clock signal of waveform D shown in FIG. 7 and thereafter is held at a resistor R22 and a capacitor C21. The held signal is amplified at a transistor Q23 so that the sample and hold signal of L' waveform shown in FIG. 7 is outputted. The sample and hold signal L' is sampled at a transistor Q25 by the fifth clock signal E of which the rising time is delayed by one pitch than that of the fourth clock signal D, so that the signal N of the N waveform shown in FIG. 7, of which the rising time is delayed by one pitch than that of the sampled signal J. The signals represented by alphabetic characters within the parentheses in FIG. 4 are the input or output signals of the third pitch delay circuit.

Said one-pitch delayed signal N is supplied to the first adder and multiplier circuit 50 so that it is added to the sampled signal K of the 2-decimation means 20. And thereafter, in said circuit 50, the added value is multiplied by $\frac{1}{2}$. Now, it will be hereinafter explained with reference to the detailed circuit of the first adder and multiplier circuit 50 shown in FIG. 5.

Said sampled signal K and said one-pitch delayed signal N are added each other at an operational amplifier 51 and then the added value is multiplied by $-\frac{1}{2}$:

$$A_0 = -\left(\frac{K}{R31} + \frac{N}{R32}\right)R36$$

(where $A_o$ is the output voltage of an operational amplifier 51.)

If R31 = R32 = 2R and also if R36 = R, $$A_0 = \left(\frac{K}{2R} + \frac{N}{2R}\right)R \quad [1]$$
$$= -\left(\frac{K+N}{2}\right)$$

Since the phase of said output voltage $A_o$ is inverted by 180 degrees than that of the input signal (that is, said output voltage $A_o$ and the input signal are 180 degrees out of phase), said output voltage $A_o$ of said operational amplifier 51 is again inverted at an operational amplifier 52 as the following equation [2]:

$$Q = -\frac{R38}{R37} A_0$$

If R38=R37, then Q is $$Q = -A_o \quad [2]$$

That is, the added and multiplied signal of Q waveform shown in FIG. 7 is applied to an adder means 70. The signals represented by alphabetic characters within the parentheses in FIG. 5 represents the input or output signals when the circuit of FIG. 5 is used for the second adder and multiplier means.

Said added and multiplied signal Q is applied to the adder means 70 shown in FIG. 6. And then, the 0.5 pitch delayed signal I from the first pitch delay means 10, the added and multiplied signals Q and P from the 1st and 2nd adder and multiplier means 50 and 60, and the basic clock signal A having the A waveform of FIG. 7 are added in an operational amplifier 71. The output signal from said operational amplifier 71 is current-amplified at a transistor Q41 to be sampled at a transistor Q42 by the basic clock signal A. And thereafter, this sampled signal is held at a resistor R49 and a capacitor C41. Said held signal is current-amplified at a transistor Q43 so that the signal R having the R waveform shown in FIG. 7 is outputted. Also, if this output signal R is sampled and held, a signal having the S waveform shown in FIG. 7 can be obtained although this S signal is not shown in FIG. 1.

That is, it can be seen that said output signal R and the S signal having the S waveform shown in FIG. 7 are considerably smoothed and approximated to the analog signal as compared with the video input signal G and the current-amplified signal H, respectively.

Figure 9A:
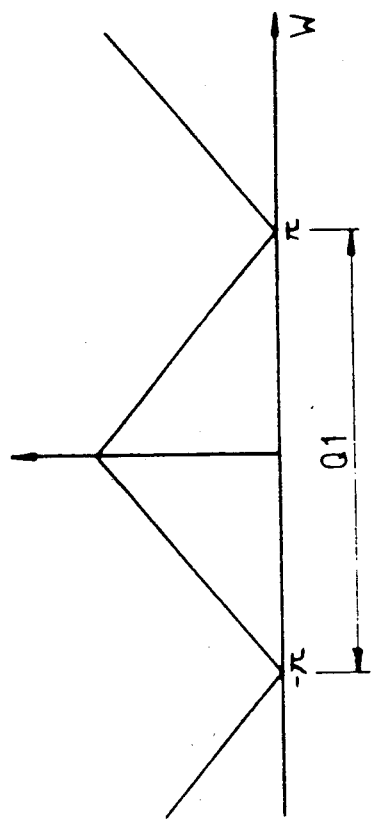
FIGS. 9A and 9B are views for explaining the frequency characteristic according to the present invention.
Figure 9B:
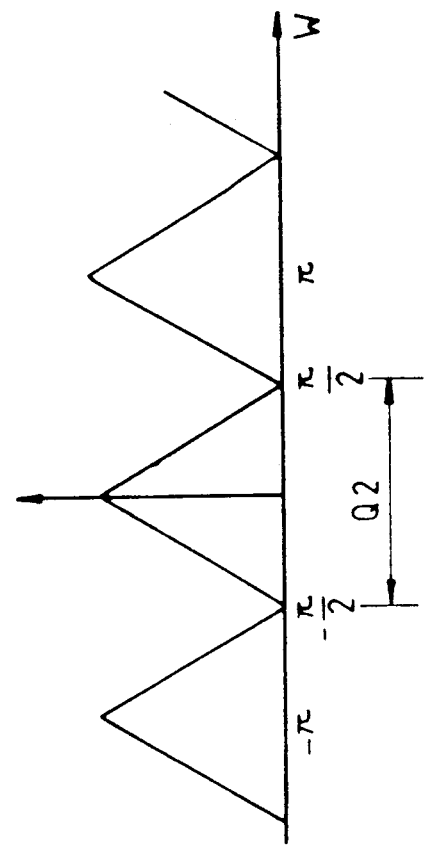

The graph shown in FIG. 9 represent the explanation of said relationships. While in FIG. 9A the frequency band of the H signal is Q1 ($=2\pi$), the frequency band of the S signal in FIG. 9B is decreased to Q2 ($=\pi$). Therefore, if said two signals is passed through the low pass filter, the S signal can obtain the greatly excellent waveform. Accordingly, the improvement of picture quality is achieved.

The present invention relates to the picture quality improving circuit which processes more smoothly the discrete signal outputted from the CCD photoelectric conversion device of the video camera using the CCD image pickup device thereby to improve the picture quality, and which delays said discrete signal by using the sampling and holding functions. This employs the technique that adds said delayed nth signal to the n+1 th signal and thereafter divides this added signal by 2 so that inserts this divided signal between said nth signal and n+1th (where n is a natural number). Such function is called "interpolation". Said relationship will be explained, hereinafter.

If the pixel number (picture element number) is 1, 2, 3 . . . n, the input signal is A1,A2, A3. . . An the odd signal of the 2-decimation means 20 is A1,A3,A5. . . A2n−1, and the even signal thereof is A2,A4,A6. . . A2n, then the interpolation is as follows:

$$(A_1 + A_2)/2 = A_1 + \theta',$$
$$(A_2 + A_3)/2 = A_2 + \theta',$$
$$\vdots$$
$$(A_n + A_n + 1)/2 = A_n + \theta',$$

wherein $\theta'$ is 0.5 pitch.

As described above, the present invention has advantages that can improve the signal-to-noise ratio and the picture quality by interpolating the sampling video signal of the CCD image pickup device in the video camera, and can be used in the digital signal processing in the image processing system and the field of communication.

While a preferred embodiment of the invention has been described using specific terms, such description is for illustrative purposes only, and it is to be understood that changes and variations may be without departing from the spirit or scope of the following claims.

What is claimed is:

1. A circuit for improving picture quality by interpolation, in a video camera, comprising;

a basic clock input terminal for input of a basic clock signal;

first delay means for sampling and holding an input video signal for output as a delayed video signal delayed by a first period;

decimation means for separating said input video signal into two separate signals, a first one of said two separate signals representative of odd pixels of said input video signal and a second one of said two separate signals representative of even pixels of said input video signal, and for sampling said first one of said two separate signals for outputting a first sampled signal and for sampling said second one of said two separate signals for outputting a second sampled signal, said two separate signals also being provided as outputs of said decimation means;

second delay means for delaying said first sampled signal for a second period twice said first period to output a delayed first sampled signal;

third delay means for delaying said second sampled signal for said second period to output a delayed second sampled signal;

first adder and multiplier means for adding said first one of said two separate signals and said delayed first sampled signal for producing a first added signal and for multiplying said first added signal by ½;

second adder and multiplier means for adding said second one of said two separate signals and said delayed second sample signal for producing a second added signal and for multiplying said second added signal by ½; and means for adding said first added signal multiplied by ½, said second added signal multiplied by ½, said delayed video signal from said first delay means, and said basic clock signal for producing an improved picture signal.

2. The circuit as set forth in claim 1, wherein said first delay means comprises;
- a first amplifying means for amplifying said input video signal;
- a sample and hold means for sampling and holding a first amplified video signal from said first amplifying means;
- second amplifying means for amplifying a sampled and held signal from said sample and hold means; and
- a sampling means for sampling a second amplified video signal from said second amplifying means.

3. The circuit as set forth in claim 2, wherein said sample and hold means comprises:
- a first transistor responsive to a first clock signal, said first clock signal having a frequency equal to one-half the frequency of said basic clock signal, for passing said first amplified signal;
- a resistor coupled to receive said first amplified signal passed by said first transistor; and
- a capacitor connected between a reference potential and a node coupling said resistor to said second amplifying means.

4. The circuit as claimed in claim 3, wherein said second amplifying means comprises:
- a second transistor having a base coupled to said node and an emitter coupled to said reference potential; and
- a third transistor having a base coupled to said emitter of said second transistor, a collector coupled to said reference potential and an emitter for providing said second amplified video signal to said sampling means.

5. The circuit as set forth in claim 4 wherein said sampling means comprises:
- a fourth transistor responsive to a second clock signal, said second clock signal having a frequency equal to said frequency of said first clock signal delayed by one-half a cycle period of said first clock signal, for providing said second amplified video signal to said means for adding as said delayed video signal from said first delay means.

6. The circuit as set forth in claim 1, wherein said decimation means comprises:
- an analog switch responsive to a first clock signal, said first clock signal having a frequency equal to one-forth the frequency of said basic clock signal, for providing said odd pixels to a first output terminal when said first clock signal has a high value and for providing said even pixels to a second output terminal when said first clock signal has a low value;
- a first transistor having a base connected to said first output terminal and an emitter connected to ground, for amplifying said odd pixels to provide said first one of said two separate signals to said first adder and multiplier means via said emitter;
- a first sampling transistor connected to said emitter of said first transistor for providing said delayed first sampled signal to said first adder and multiplier means in response to a second clock signal;
- a second transistor having a base connected to said second output terminal and an emitter connected to ground, for amplifying said even pixels to provide said second one of said two separate signals to said second adder and multiplier means via said emitter of said second transistor; and
- a second sampling transistor connected to said emitter of said second transistor for providing said delayed second sampled signal to said second adder and multiplier means in response to a third clock signal.

7. The circuit as set forth in claim 1, wherein said first adder and multiplier means comprises:
- a first resistor connected to a first terminal of an operation amplifier for providing said first one of said two separate signals to said first terminal;
- a second resistor connected to said first terminal of said operation amplifier for providing said delayed first sampled signal to said first terminal;
- said operational amplifier having a second input terminal connected between a power source and a reference potential, wherein said operational amplifier provides a first added signal multiplied by $-\frac{1}{2}$; and
- an inverting amplifier having a first terminal connected to an output terminal of said operational amplifier and a second terminal connected to said second input terminal of said operational amplifier, for providing said first added signal multiplied by $\frac{1}{2}$.

8. The circuit as set forth in claim 1, wherein said second adder and multiplier means comprises:
- a first resistor connected to a first terminal of an operation amplifier for providing said second one of said two separate signals to said first terminal;
- a second resistor connected to said first terminal of said operation amplifier for providing said delayed second sampled signal to said first terminal;
- said operational amplifier having a second input terminal connected between a power source and a reference potential, wherein said operational amplifier provides a second added signal multiplied by $-\frac{1}{2}$; and
- an inverting amplifier having a first terminal connected to an output terminal of said operational amplifier and a second terminal connected to said second input terminal of said operational amplifier, for providing said second added signal multiplied by $\frac{1}{2}$.

9. The circuit as set forth in claim 1, wherein said means for adding comprises:
- an operational amplifier having a first input terminal connected to receive said first added signal multiplied by $\frac{1}{2}$, said second added signal multiplied by $\frac{1}{2}$ and said basic clock signal via respective resistors and a second input terminal connected between a power source and a reference potential, for adding said first added signal multiplied by $\frac{1}{2}$, said second added signal multiplied by $\frac{1}{2}$ and said basic clock signal to provide a third added signal;
- a first transistor having a base connected to an output terminal of said operational amplifier, an emitter coupled to said power source and a collector connected to said reference potential, for amplifying said third added signal;
- sample and hold means including a second transistor connected to the emitter of said first transistor for sampling and passing said amplified third added signal to a capacitor for holding said sampled amplified third added signal; and
- a third transistor having a base connected to an output of said sample and hold means, a collector connected to said power source and an emitter connected to said reference potential, for providing said improved picture signal via said emitter of said third transistor.

* * * * *

UNITED STATES PATENT AND TRADEMARK OFFICE
CERTIFICATE OF CORRECTION

PATENT NO. : 5,049,998

DATED : September 17, 1991

INVENTOR(S) : Hyo - sam LEE

It is certified that error appears in the above-identified patent and that said Letters Patent is hereby corrected as shown below:

<u>IN THE ABSTRACT</u>

Note: The line count begins on line 1 of the actual Abstract text, not including the heading "ABSTRACT".

Line 17, change "imporve" to --improved--.

Column 1, Line 16, change "a" to --an--;

Line 17, insert --a-- after "of", and insert --a-- after "is";

Line 47, insert --circuit-- before "30";

Line 52, change "represents" to --represent--;

Line 65, change "." to --:--;

Column 2, Line 11, delete ",";

Line 36, change "circuits" to --circuit--;

Column 3, Line 42, change "circuits" to --circuit--;

Column 4, Line 24, change "constructions" to --construction--;

Line 31, change "said" to --the--;

Line 49, change "Said" to --The--;

UNITED STATES PATENT AND TRADEMARK OFFICE
CERTIFICATE OF CORRECTION

PATENT NO. : 5,049,998

DATED : September 17, 1991

INVENTOR(S) : Hyo - sam LEE

It is certified that error appears in the above-identified patent and that said Letters Patent is hereby corrected as shown below:

Column 4, Line 51, change "means" to --circuit--;

Line 56, change "Said" to --The--, and change "said" to --the--;

Line 57, insert --to-- after "added";

Column 5, Line 9, change "said" to --the--;

Line 10, change "said" to --the--;

Line 12, change "said" to --the-- (both occurrences);

Line 23, change "means" to --circuit--;

Line 28, change "Said" to --The--;

Line 29, change "means" to --circuit--;

Line 30, change "means" to --circuit--;

Line 32, change "means" to --circuits--;

Line 35, change "said" to --the--;

Line 39, change "Said" to --The--;

Line 45, change "said" to --the--;

Line 51, change "said" to --the--;

UNITED STATES PATENT AND TRADEMARK OFFICE
CERTIFICATE OF CORRECTION

PATENT NO. : 5,049,998
DATED : September 17, 1991
INVENTOR(S) : Hyo - sam LEE It is certified that error appears in the above-identified patent and that said Letters Patent is hereby corrected as shown below:

Column 5, Line 54, change "said" to --the--, and change "is" to --are--;

Line 63, change "said" to --the--;

Line 65, change "said" to --the--;

Column 6, Line 1, change "Said" to --The--;

Line 5, change "means" to --circuit--;

Line 18, delete "the".

Claim 2, Column 7, Line 5, delete "a";

Line 7, delete "a" (first occurrence);

Line 13, delete "a" (first occurrence);

UNITED STATES PATENT AND TRADEMARK OFFICE
CERTIFICATE OF CORRECTION

PATENT NO. : 5,049,998

DATED : September 17, 1991

INVENTOR(S) : Hyo - sam LEE

It is certified that error appears in the above-identified patent and that said Letters Patent is hereby corrected as shown below:

Claim 5, Column 7, LIne 35, insert --,-- after "claim 4".

Signed and Sealed this

Fifth Day of January, 1993

Attest:

DOUGLAS B. COMER

Attesting Officer

Acting Commissioner of Patents and Trademarks